UNITED STATES PATENT OFFICE.

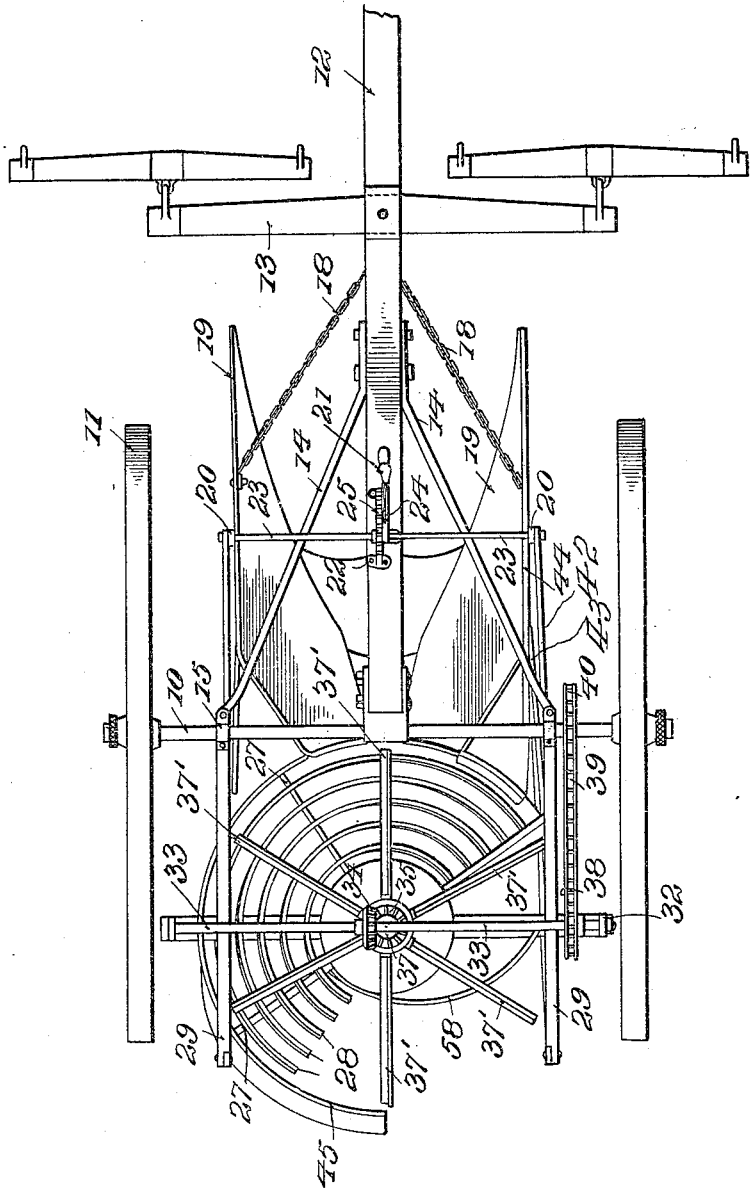

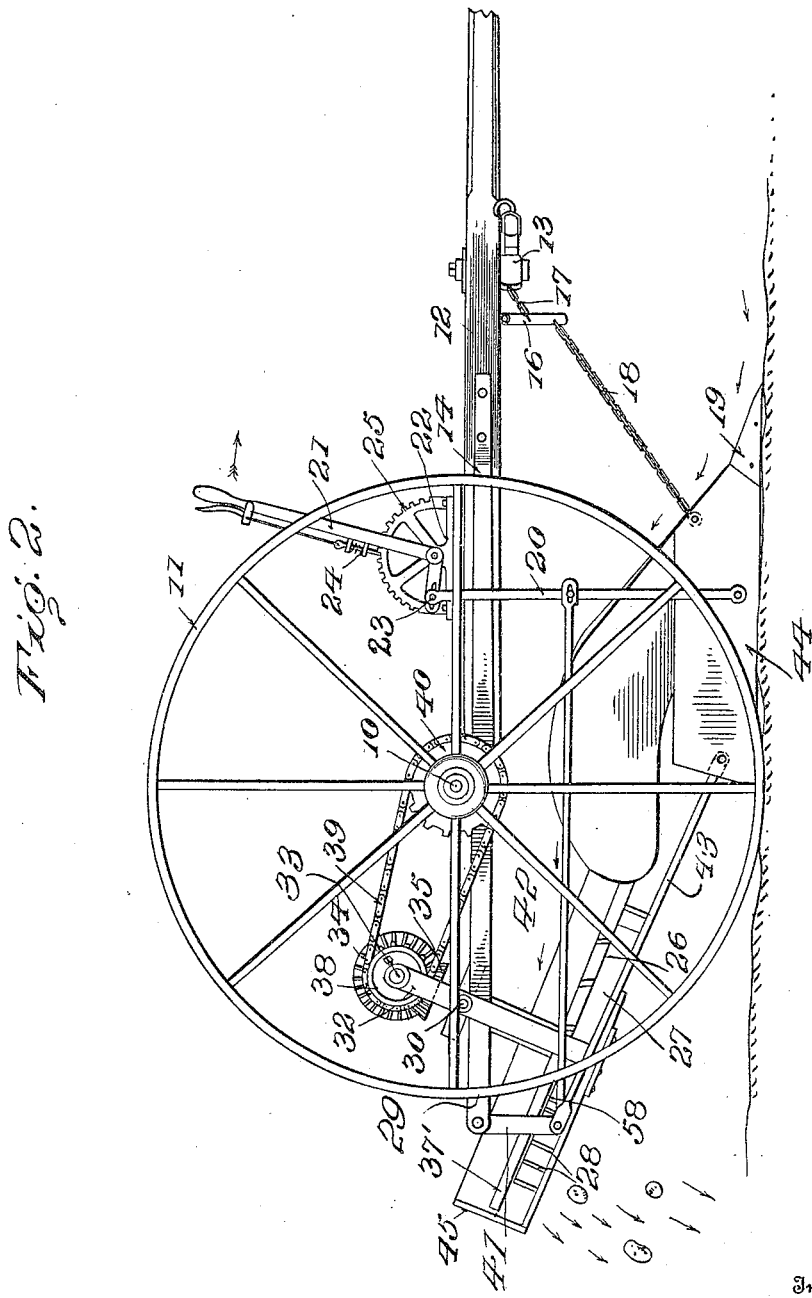

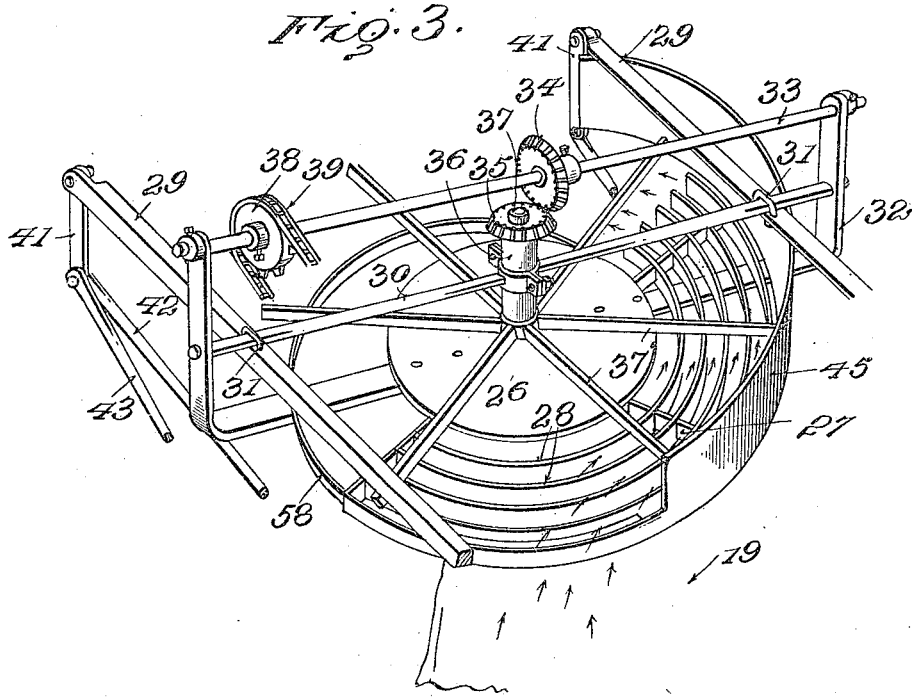
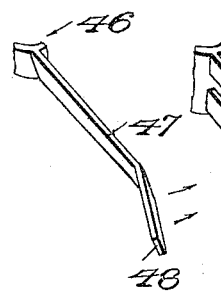
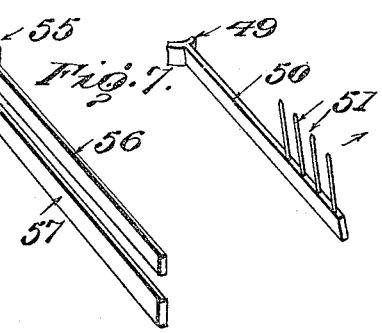
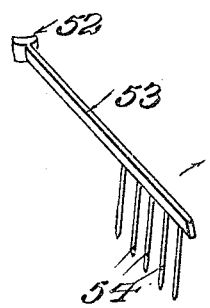

OTTO R. BROWN, OF HORNELL, NEW YORK.

POTATO DIGGER AND SEPARATOR.

952,873. Specification of Letters Patent. Patented Mar. 22, 1910.

Application filed June 22, 1909. Serial No. 503,658.

*To all whom it may concern:*

Be it known that I, OTTO R. BROWN, citizen of the United States, residing at Hornell, in the county of Steuben and State of New York, have invented certain new and useful Improvements in Potato Diggers and Separators, of which the following is a specification.

This invention relates to diggers and has particular reference to a combined potato digger and separator.

An object of this invention is to provide a device which will raise potatoes from the ground and will separate the same before delivering the potatoes to the receptacle which is applied to the implement for such purpose.

Another object of the invention is the provision of simple means whereby the motion of the implement will not be retarded to any great extent by the application of this mechanism and which will at the same time effectually separate the dirt and stones from the potatoes as the same are fed upwardly from the shovels toward the rear of the machine.

The invention contemplates the production of an implement whereby the potatoes will be dug from the ground and carried to a receptacle in which a plurality of arms are disposed which strike the potatoes and earth, and by reason of the jarring of the same, separate the dirt from the potatoes and permit the dirt to fall upon the ground, whereupon the potatoes are carried backwardly to a point where a receptacle of any suitable formation is attached. In this connection it contemplates the construction of such an implement whereby the separator arms are given a rotary motion at a high speed so as to admit only a small portion of the dirt and potatoes between each arm, thereby furthering the operation of the device in causing the feeding of but small quantities to the separator.

For a full understanding of the invention reference is to be had to the following description and accompanying drawings, in which:—

Figure 1 is a top plan view of the complete implement. Fig. 2 is a side elevation of the same. Fig. 3 is a detailed perspective view of the separator attachment, and Figs. 4, 5, 6 and 7 disclose modified forms of the separator arms employed in connection with the implement.

Corresponding and like parts are referred to in the following description and indicated in all the views of the drawings by the same reference characters.

Referring to the drawings the numeral 10 designates a main axle which is supported upon a pair of drive wheels 11 disposed upon the opposite ends of the axle 10. The axle 10 is provided intermediately with a tongue 12 which extends forwardly and carries a suitable doubletree or the like 13 for drawing the implement. The tongue 12 is provided with rearwardly diverging braces 14 which engage collars 15 carried upon the axle 10 and is provided with a depending link 16 which is connected by a chain 17 to the doubletree 13 and which is provided with a second chain 18 which extends downwardly and engages the opposite points of a shovel 19. The shovel 19 is supported beneath the tongue 12 by means of the connecting rods 20 secured at their lower extremities in pivotal relation upon the outer sides of the shovel 19 and pivotally connected to the short arm of a bell-crank-lever 21 which is mounted upon a base 22 carried upon the upper face of the tongue 12. The connecting rods 20 are retained in rigid relation to the bell-crank lever 21 by the employment of a transverse rod 23 which extends across the tongue 12 and braces 14 and is pivotally engaged at its opposite extremities to the upper ends of the connecting rods 20. The intermediate portion of the transverse rod 23 is loosely connected to the short arm of the bell-crank lever 21. The bell-crank lever 21 is formed with a handle which is provided with a pawl 24 for engagement with a rack 25 to support the lever 21 rigidly in the various angles desired. It is by this means that the shovels 19 are raised or lowered in accordance with the depth desired to insert the points in the ground. The rear extremities of the shovels 19 converge and extend upwardly where they terminate in the forward edge of a frame which is of circular formation and which is composed of a disk 26 which is provided with a plurality of radially extended arms 27 over which are engaged and rigidly secured a plurality of circular strips 28 which are disposed concentrically in spaced relation to admit of the passage of dirt therethrough which is carried upwardly from the frame through the medium of the shovels 19.

The sleeves 15 which are carried upon the main axle 10 are provided with rearwardly extended supports 29 which are disposed in parallel and which carry across their intermediate portion a bar 30 which is secured thereto through the medium of a pair of U-shaped bolts 31 which straddle the bar 30 and engage through the supports 29. The opposite extremities of the bar 30 are secured intermediately upon the opposite arms of a frame 32 which is of U-formation having the extremities thereof extended upwardly and having the intermediate portion of the same engaged across the under face of the disk 26. The upper extremities of the frame 32 are provided with bearings of any adaptable construction into which are positioned the opposite extremities of a drive shaft 33 which extends over the center of the disk 26. The drive shaft 33 is provided at its central portion with a beveled gear 34 which meshes with a second beveled gear 35 which is carried upon the upper extremity of a sleeve 36 mounted loosely about a stub shaft 37 which is projected upwardly from the disk 26. The lower extremity of the sleeve 36 is provided with a plurality of radially extending arms 37' which lie closely against the upper edges of the concentrically positioned strips 28 and which revolve thereover under the action of the sleeve 36. As shown in Fig. 3 of the drawings the radially extended arms 37' are of straight formation having opposite flattened edges for engagement with the potatoes which are disposed upon the upper edges of the strips 28 for the purpose of carrying the same and of causing the dirt which adheres to the potatoes to drop from the same under the action of the arms.

The means employed for driving the separator frame comprises a sprocket wheel 38 mounted rigidly upon one end of the drive shaft 33 and which supports a chain 39 which passes forwardly and engages over an enlarged sprocket 40 mounted upon the main shaft 10.

For the purpose of further strengthening the implement the supports 29 are each provided with depending links 41 which carry at their lower extremity in pivotal relation the forwardly extended reach rods 42 and 43. The reach rods 42 extend forwardly beneath and beyond the main axle 10 where they are loosely connected to intermediate points upon the connecting rods 20 which depend from the bell-crank lever 21. The reach rods 43 are extended forwardly and downwardly where they are engaged with the rear extremities of the landsides 44 of the shovels.

The strips 28 terminate at one side of the machine at a point rearwardly of the transverse frame 32 for the purpose of admitting of the dropping of stones or the like which are carried upwardly upon the shovels 19. Disposed about the strips 28 is an arcuate flange 45 which is mounted upon the outer extremities of the radially extended arms 27 and which is projected upwardly beyond the strips 28 and the rotary or separator arms 37', the flange 45 being extended at each extremity slightly beyond the ends of the concentric strips 28.

The separator is provided with a spiral strip 58 which is secured at one extremity to the flange 45 at one end thereof and is carried rearwardly of the implement and curved inwardly where its opposite extremity is secured to the end of the innermost of the concentric strips 28. The spiral strip 58 is preferably sprung upwardly to frictionally engage with the nuder edges of the arms 37' in order to scrape from the same any material which has a tendency to adhere thereto owing to the force of impact as the arms 37' are rotated.

In the modification disclosed in Fig. 4 the sleeve 46 is provided with a radially extended arm 47 which is formed of a flattened bar and which is provided with a backwardly extended portion 48 at its outer extremity for the purpose of more effectually throwing the dirt toward the circumference of the circular separator frame.

Fig. 5 discloses a modification in which the sleeve 49 is provided with an outwardly projected arm 50 formed preferably from the flattened metallic bar and which is provided at its outer end with a plurality of equi-distantly spaced teeth 51 which are projected upwardly therefrom and which serve the purpose of retaining the potatoes, stones, or other substances collected by the shovels from passing upwardly over the arm 50 during the operation of the machine.

A further modified form is disclosed in Fig. 6 in which the sleeve 52 carries a radially extended arm 53, upon the outer end of which are positioned a plurality of spaced teeth 54 which extend downwardly and forwardly to form a fork for the reception of the potatoes which are disposed upon the upper edges of the strips 28. This formation of arm causes a scooping action and thereby forms a ready and effective means for separating the dirt from the potatoes, insomuch that the potatoes are caused to bound back and forth before the tines 54, loosening the adhering dirt therefrom. When this form is employed the arms 53 are mounted higher upon the sleeve 52 to admit of the passage of the tines 54 over the radial braces which support the strips 28 and over the scraper 58.

Fig. 7 shows a still further modified form of the separator arms in which the sleeve 55 carries a pair of vertically spaced flattened bars 56 and 57 which are smooth upon their opposite sides and which provide means for engaging the matter to be moved and of permitting of the passage of small particles thereof between the bars 56 and 57.

In operation as the implement is moved forwardly the wheels 11 are revolved and the axle 10 therewith. This motion is communicated through the sprocket 40, chain 39 and sprocket 38 to the drive shaft 33 whereby the beveled gears 34 and 35 are set in motion and the sleeve 36 is actuated. As the sleeve 36 is revolved the radially extended arms 37' are carried therewith and caused to ride rigidly over the upper edge of the concentric strips 28. At the same time the shovels 19 engage in the earth and cause the feeding upwardly of quantities of earth and potatoes and the same are caused to be deposited upon the upper edges of the strips 28 where they are engaged by the arms 37' which are carried past the same.

It will be noted from the drawing that at the point where the shovels engage with the circular separator frame the flange 45 is slightly reduced in height to admit of the positioning of the potatoes directly upon the upper edges of the strips 28. When the arms 37' strike the accumulated material upon the concentric strips 28 the material is violently agitated and the dirt is thereby caused to disengage from the potatoes and to fall downwardly through the spaces between the strips 28 when the potatoes are carried onwardly and deposited in a suitable receptacle positioned at the rear of the circular frame.

It is readily observed that by manipulating the bell-crank lever 21 the depth of the shovels 19 can be regulated according to the depth at which it is desired to insert the same so as to enable the digging of the potatoes from the ground.

Having thus described the invention what is claimed as new is:—

1. An implement as specified including a frame, shovels carried by said frame, a circular member disposed rearwardly of said shovels to receive potatoes and earth from the same, a plurality of radially extended arms rotatably mounted above said member for engagement with the potatoes and earth, means for actuating said arms and a spiral scraper carried by said member for engagement with said arms to remove adhering substances from the same.

2. A digger including a frame, a pair of shovels mounted at the forward end of said frame and adapted for adjustment thereon and having converging extremities, a separator mounted at the rear of the frame adjacent the inner converging extremities of said shovels, and means connected between said shovels and said separator for adjusting the same simultaneously.

3. A digger including a frame, a pair of shovels adjustably disposed upon the forward end of said frame and converging at their rear extremities, a separator pivotally mounted on said frame and connected to said shovels, and a lever mounted on said frame and connected between said shovels and said separator for adjusting the same.

4. A digger including a frame, shovels mounted at the forward end of said frame, means for adjusting said shovels, a transverse frame disposed across the rear end of said first frame, a plurality of concentric strips positioned on said transverse frame and arranged substantially circular, a plurality of arms disposed upon said transverse frame adjacent said strips, and a scraper spirally disposed between the terminated extremities of said concentric strips for engagement with said arms.

5. A digger including a frame, shovels mounted at the forward end of said frame, a transverse frame located at the rear extremity of said main frame, a plurality of concentric strips mounted on said transverse frame, a sleeve rotatably disposed on said transverse frame centrally of said strips, a plurality of arms radially extended from said sleeve over said strips, braces mounted on said transverse frame, a transverse shaft located across the upper ends of said braces, gears carried by said transverse shaft and said sleeve in meshed relation, a sprocket mounted on said transverse shaft, traction wheels mounted on said main frame, a sprocket carried by one of said traction wheels and a chain disposed over said sprockets for communicating motion between the traction wheels and said arms.

6. A digger including a main frame, shovels mounted on the forward end of said main frame, a lever carried by said main frame, and connected to said shovels for adjusting the same, a transverse frame pivotally mounted upon the rear end of said main frame, rods disposed between said transverse frame and said lever for adjusting said transverse frame, a plurality of concentric strips mounted on said transverse frame, and a plurality of radially extended arms carried by said transverse frame for rotary movement above said strips.

7. A digger including a main frame, a circular separator carried by said frame, a plurality of arms mounted on said separator and radially extended from the center thereof, and a spiral scraper mounted on the separator for engagement against the under sides of said arms throughout their lengths.

In testimony whereof I affix my signature in presence of two witnesses.

OTTO R. BROWN. [L. S.]

Witnesses:
ANNA HENNESSY,
ACTON M. HILL.